United States Patent
Bae

(10) Patent No.: US 9,865,391 B2
(45) Date of Patent: Jan. 9, 2018

(54) WIRELESS POWER REPEATER AND METHOD THEREOF

(75) Inventor: Su Ho Bae, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 727 days.

(21) Appl. No.: 14/130,258

(22) PCT Filed: Jun. 22, 2012

(86) PCT No.: PCT/KR2012/004945
§ 371 (c)(1),
(2), (4) Date: Dec. 30, 2013

(87) PCT Pub. No.: WO2013/002516
PCT Pub. Date: Jan. 3, 2013

(65) Prior Publication Data
US 2014/0125145 A1 May 8, 2014

(30) Foreign Application Priority Data

Jun. 29, 2011 (KR) .......................... 10-2011-0064109

(51) Int. Cl.
*H01F 27/42* (2006.01)
*H01F 37/00* (2006.01)
(Continued)

(52) U.S. Cl.
CPC .............. *H01F 38/14* (2013.01); *H02J 7/025* (2013.01); *H02J 17/00* (2013.01); *H04B 5/00* (2013.01); *H04B 5/0037* (2013.01); *H04B 7/15* (2013.01)

(58) Field of Classification Search
CPC .... H04B 7/14; H04B 5/00; H04B 1/04; H02J 17/00
(Continued)

(56) References Cited

U.S. PATENT DOCUMENTS

| | | | |
|---|---|---|---|
| 6,236,143 B1 * | 5/2001 | Lesieutre | ............ H01L 41/0933 310/328 |
| 8,452,235 B2 * | 5/2013 | Kirby | ................... H04B 5/0031 307/104 |

(Continued)

FOREIGN PATENT DOCUMENTS

| JP | 2001-231186 A | 8/2001 |
|---|---|---|
| JP | 2003-284112 A | 10/2003 |
| KR | 10-2011-0062841 A | 6/2011 |

OTHER PUBLICATIONS

International Search Report in International Application No. PCT/KR2012/004945, filed Jun. 22, 2012.

*Primary Examiner* — Rexford Barnie
*Assistant Examiner* — Jagdeep Dhillon
(74) *Attorney, Agent, or Firm* — Saliwanchik, Lloyd & Eisenschenk

(57) ABSTRACT

A wireless power repeater for relaying power transmission between a wireless power transmitter and a wireless power receiver according to the embodiment includes a position detector for detecting a position of the wireless power receiver, a repeater resonator unit including a plurality of repeater resonators, and a controller for operating a specific repeater resonator, which is located closest to an extension line of the wireless power transmitter and the wireless power receiver, based on position information detected by the position detector.

17 Claims, 3 Drawing Sheets

(51) Int. Cl.
    *H01F 38/00*       (2006.01)
    *H01F 38/14*       (2006.01)
    *H04B 5/00*        (2006.01)
    *H02J 7/02*        (2016.01)
    *H02J 17/00*       (2006.01)
    *H04B 7/15*        (2006.01)

(58) Field of Classification Search
    USPC ........ 307/104, 149, 82, 80, 9.1, 10.1; 455/7,
                           455/41.2, 41.1, 24, 19, 523, 67.15
    See application file for complete search history.

(56) References Cited

U.S. PATENT DOCUMENTS

| | | | |
|---|---|---|---|
| 8,611,815 B2* | 12/2013 | Mohammadian | G06K 7/0008 |
| | | | 455/13.4 |
| 2001/0034240 A1* | 10/2001 | Koshima | H04B 7/2606 |
| | | | 455/457 |
| 2003/0162550 A1* | 8/2003 | Kuwahara | G01S 5/0205 |
| | | | 455/456.1 |
| 2009/0053993 A1* | 2/2009 | Baker | G01S 19/06 |
| | | | 455/7 |
| 2011/0133569 A1 | 6/2011 | Cheon et al. | |
| 2011/0281535 A1* | 11/2011 | Low | H02J 7/025 |
| | | | 455/129 |
| 2012/0153732 A1* | 6/2012 | Kurs | B60L 3/0069 |
| | | | 307/104 |

\* cited by examiner

[Fig. 1]
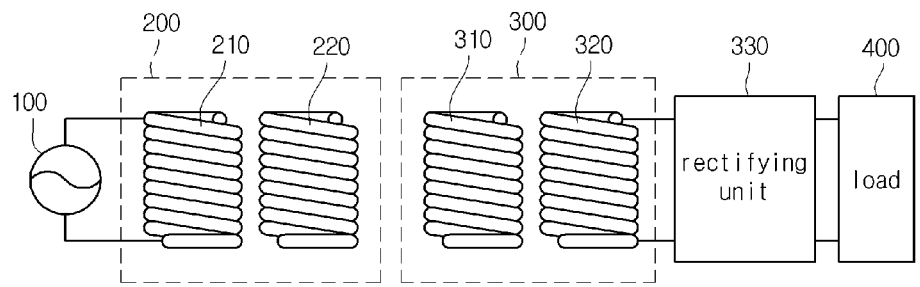
[Fig. 2]
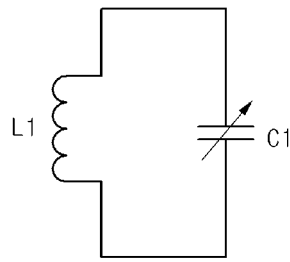
[Fig. 3]
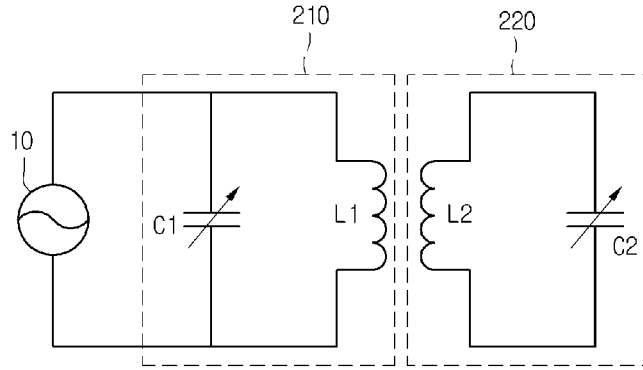
[Fig. 4]
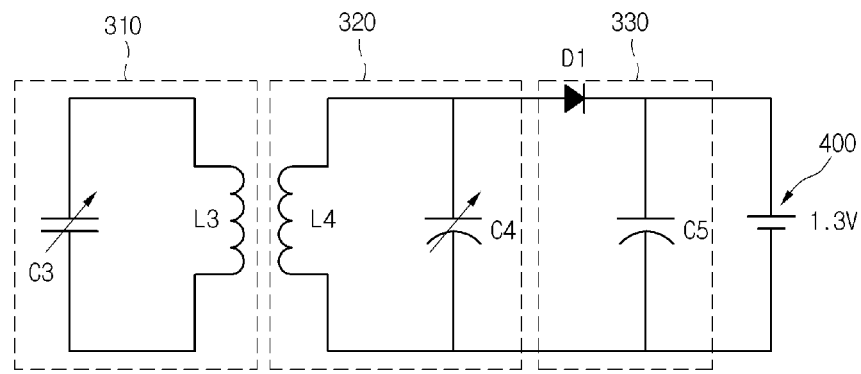

[Fig. 5]
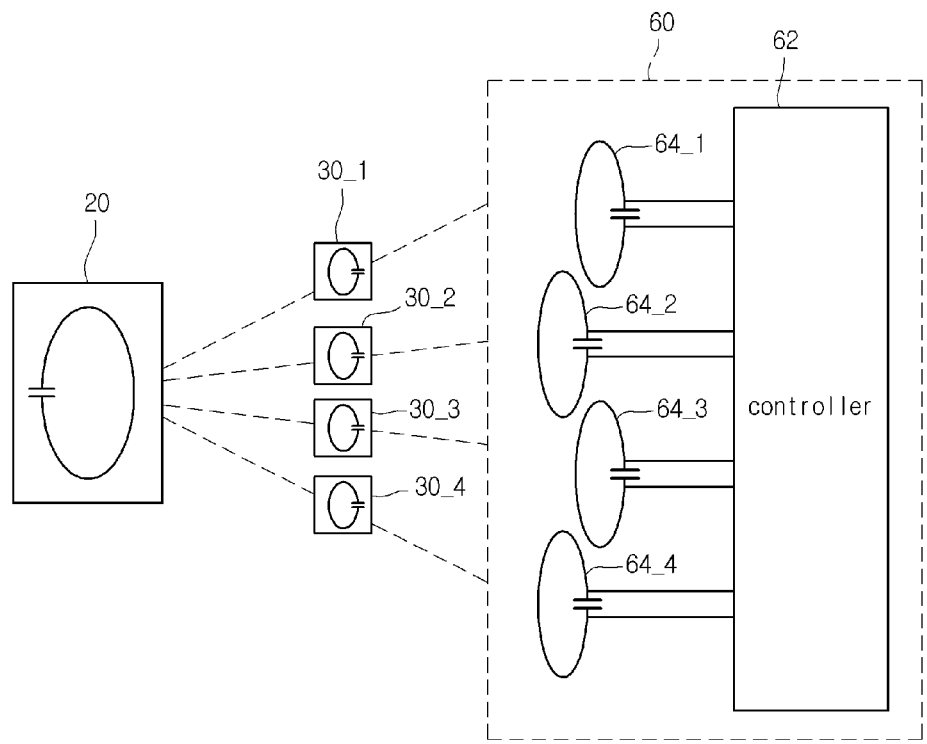
[Fig. 6]
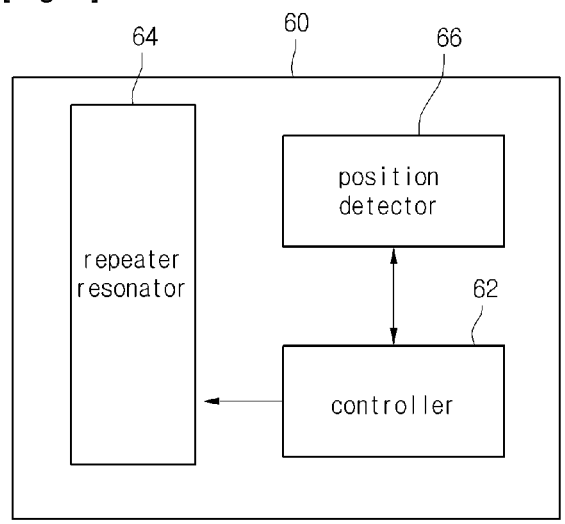

[Fig. 7]
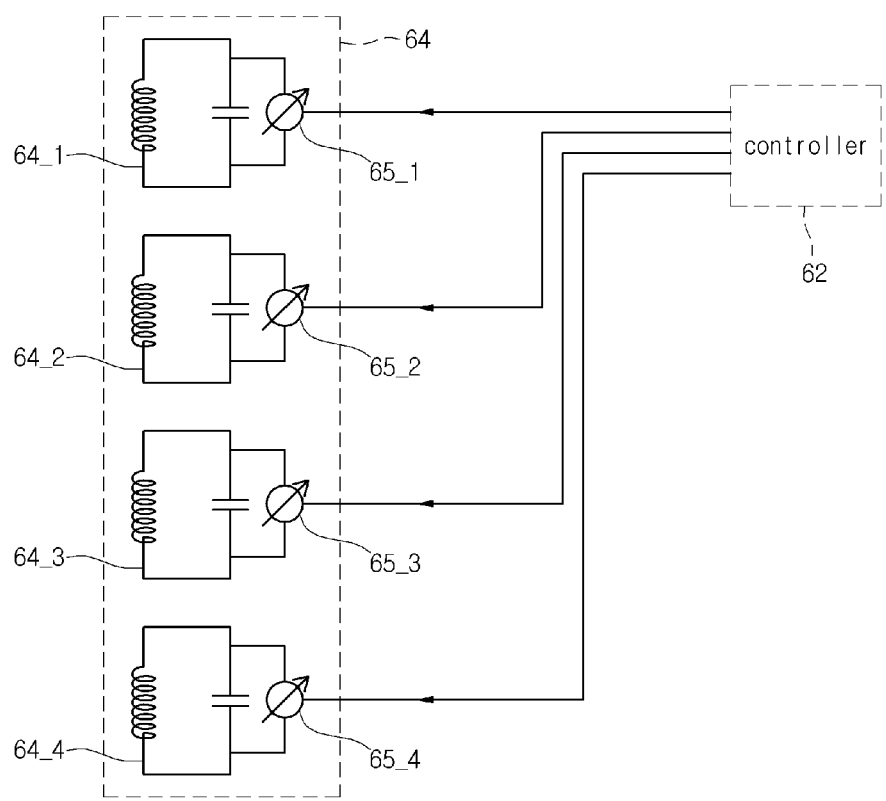

WIRELESS POWER REPEATER AND METHOD THEREOF

CROSS-REFERENCE TO RELATED APPLICATIONS

This application is the U.S. national stage application of International Patent Application No. PCT/KR2012/004945, filed Jun. 22, 2012, which claims priority to Korean Application No. 10-2011-0064109, filed Jun. 29, 2011, the disclosures of each of which are incorporated herein by reference in their entirety.

TECHNICAL FIELD

The disclosure relates to a wireless power transmission technology. In more particular, the disclosure relates to a wireless power repeater for concentrating wireless power, which is transmitted from a wireless power transmitter, in a specific direction and a method thereof.

BACKGROUND ART

A wireless power transmission or a wireless energy transfer refers to a technology for wirelessly transferring electric energy to desired devices. In the 1800's, an electric motor or a transformer employing the principle of electromagnetic induction has been extensively used and then a method for transmitting electrical energy by irradiating electromagnetic waves, such as radio waves or lasers, has been suggested. Actually, electrical toothbrushes or electrical razors, which are frequently used in daily life, are charged based on the principle of electromagnetic induction. Until now, the long-distance transmission using the magnetic induction, the resonance and the short-wavelength radio frequency has been used as the wireless energy transfer scheme.

In the case of a short-distance wireless power transmission, which has been spotlighted in these days, a wireless power transmitter is installed in a building in such a manner that a mobile device, such as a cellular phone or a notebook computer, can be continuously charged when a user uses the mobile device in the building even if the mobile device is not connected to an additional power cable.

However, in the above wireless power transmission technologies, a coupling co-efficient between a wireless power transmitter and a wireless power receiver must be equal to or higher than the critical value in order to facilitate the wireless power transmission using resonance. At this time, the coupling coefficient may be determined depending on the size of a transmission resonant coil of the transmitter and a reception resonant coil of the receiver and the distance between the transmitter and the receiver.

In general, the size of the reception resonant coil is significantly smaller than the size of the transmission resonant coil, so the coupling coefficient between the transmission resonant coil and the reception resonant coil is very small.

If the coupling coefficient between the transmitter and the receiver is lower than the critical value, magnetic induction may prevail over magnetic resonance required for the wireless power transmission. Thus, the effective wireless power transmission may not be achieved between the wireless power transmitter and the wireless power receiver.

DISCLOSURE OF INVENTION

Technical Problem

The disclosure provides a wireless power repeater for concentrating wireless power, which is transmitted from a wireless power transmitter, in a specific direction, and a method thereof.

In addition, the disclosure provides a wireless power repeater which detects a location of a wireless power receiver to operate a specific repeater resonator based on the detected location of the wireless power receiver, and a method thereof.

Further, the disclosure provides a wireless power repeater capable of operating a repeater resonator located closest to an extension line connecting a wireless power transmitter to a wireless power receiver, and a method thereof.

The disclosure also provides a wireless power repeater capable of supplying energy to a wireless power receiver located between a wireless power transmitter and a repeater resonator, and a method thereof.

Solution to Problem

According to one embodiment of the disclosure, there is provided a wireless power repeater for relaying power transmission between a wireless power transmitter and a wireless power receiver, in which the wireless power repeater includes a position detector for detecting a position of the wireless power receiver; a repeater resonator unit including a plurality of repeater resonators; and a controller for operating a specific repeater resonator, which is located closest to an extension line of the wireless power transmitter and the wireless power receiver, based on position information detected by the position detector.

According to another embodiment of the disclosure, there is provided a wireless power repeater for relaying power transmission between a wireless power transmitter and a wireless power receiver, in which the wireless power repeater includes a position detector for detecting a position of the wireless power receiver; a controller for operating one repeater resonator from among a plurality of repeater resonators based on position information detected by the position detector; and a repeater resonator unit for supplying wireless power to the wireless power receiver located between the wireless power transmitter and the repeater resonator under a control of the controller.

According to still another embodiment of the disclosure, there is provided a method of relaying wireless power in a wireless power repeater for relaying power transmission between a wireless power transmitter and a wireless power receiver, in which the method includes the steps of detecting a position of the wireless power receiver, selecting a specific repeater resonator, which is located closest to an extension line of the wireless power transmitter and the wireless power receiver, based on detected position information of the wireless power receiver, and operating only the selected repeater resonator from among a plurality of repeater resonators.

Advantageous Effects of Invention

According to the embodiment of the disclosure, the specific repeater resonator of the wireless power repeater is operated based on the location of the wireless power transmitter and the wireless power receiver, so the wireless power transmitted from the wireless power transmitter can be concentrated in the specific direction.

Meanwhile, other various effects of the disclosure will be directly or indirectly disclosed in the following detailed description of the disclosure.

BRIEF DESCRIPTION OF DRAWINGS

FIG. 1 is a view showing a wireless power transmission system according to one embodiment of the disclosure;

FIG. 2 is a circuit diagram showing an equivalent circuit of a transmission induction coil according to one embodiment of the disclosure;

FIG. 3 is a circuit diagram showing an equivalent circuit of a power supply apparatus and a wireless power transmitter according to one embodiment of the disclosure;

FIG. 4 is a circuit diagram showing an equivalent circuit of a wireless power receiver according to one embodiment of the disclosure;

FIG. 5 is a view showing a scenario of a wireless power repeater according to one embodiment of the disclosure;

FIG. 6 is a view showing a wireless power repeater according to one embodiment of the disclosure; and FIG. 7 is a view showing a control method of a repeater resonator according to one embodiment of the disclosure.

BEST MODE FOR CARRYING OUT THE INVENTION

Hereinafter, exemplary embodiments of the disclosure will be described in detail so that those skilled in the art can easily comprehend the disclosure.

FIG. 1 is a view showing a wireless power transmission system according to one embodiment of the disclosure.

Referring to FIG. 1, the wireless power transmission system may include a power supply apparatus 100, a wireless power transmitter 200, a wireless power receiver 300, and a load 400.

According to one embodiment, the power supply apparatus 100 may be included in the wireless power transmitter 200.

The wireless power transmitter 200 may include a transmission induction coil 210 and a transmission resonant coil 220.

The wireless power receiver 300 may include a reception resonant coil, a reception induction coil 320, a rectifying part 330, and the load 400.

Both terminals of the power supply apparatus 100 are connected to both terminals of the transmission induction coil 210.

The transmission resonant coil 220 may be spaced apart from the transmission induction coil 210 by a predetermined distance.

The reception resonant coil 310 may be spaced apart from the reception induction coil 320 by a predetermined distance.

Both terminals of the reception induction coil 320 are connected to both terminals of the rectifying part 330, and the load 400 is connected to both terminals of the rectifying part 330. According to one embodiment, the load 400 may be included the wireless power receiver 300.

The power generated from the power supply apparatus 100 is transferred to the wireless power transmitter 200. The power received in the wireless power transmitter 200 is transferred to the wireless power receiver 300 that makes resonance with the wireless power transmitter 200 due to a resonance phenomenon, that is, has the resonance frequency the same as that of the wireless power transmitter 200.

Hereinafter, the power transmission process will be described in more detail.

The power supply apparatus 100 generates AC power having a predetermined frequency and transfers the AC power to the wireless power transmitter 200.

The transmission induction coil 210 and the transmission resonant coil 220 are inductively coupled with each other. In other words, if AC current flows through the transmission induction coil 210 due to the power received from the power supply apparatus 100, the AC current is induced to the transmission resonant coil 220 physically spaced apart from the transmission induction coil 210 due to the electromagnetic induction.

Thereafter, the power received in the transmission resonant coil 220 is transferred to the wireless power receiver 300 that makes a resonance circuit with the wireless power transmitter 200 using resonance.

Power can be transmitted between two LC circuits, which are impedance-matched with each other, using resonance. The power transmitted using the resonance can be father transferred with higher efficiency when comparing with the power transmitted by the electromagnetic induction.

The reception resonant coil 310 receives power from the transmission resonant coil 220 using the resonance. The AC current flows through the reception resonant coil 310 by the received power. The power received in the reception resonant coil 310 is transferred to the reception induction coil 320, which is inductively coupled with the reception resonant coil 310, due to the electromagnetic induction. The power received in the reception induction coil 320 is rectified by the rectifying part 330 and transferred to the load 400.

The transmission resonant coil 220 of the wireless power transmitter 200 may transmit power to the reception resonant coil 310 of the wireless power receiver 300 through a magnetic field.

In detail, the transmission resonant coil 220 and the reception resonant coil 310 are resonance-coupled with each other so that the transmission resonant coil 220 and the reception resonant coil 310 operate at a resonance frequency.

The resonance-coupling between the transmission resonant coil 220 and the reception resonant coil 310 can significantly improve the power transmission efficiency between the wireless power transmitter 200 and the wireless power receiver 300.

A quality factor and a coupling coefficient are important in the wireless power transmission.

The quality factor may refer to an index of energy that may be stored in the vicinity of a wireless power transmitter or a wireless power receiver.

The quality factor may be varied according to the operating frequency w, a coil shape, a dimension, and a material. The quality factor may be expressed as following equation, $Q=w*L/R$. In the above equation, L refers to the inductance of a coil, and R refers to resistance corresponding to the quantity of power loss caused in the coil.

The quality factor may have a value of 0 to infinity.

The coupling coefficient represents the degree of inductive coupling between a transmission coil and a receiving coil, and has a value of 0 to 1.

The coupling coefficient may be varied according to the relative position and the distance between the transmission coil and the reception coil.

FIG. 2 is a circuit diagram showing an equivalent circuit of the transmission induction coil 210 according to the one embodiment of the disclosure.

As shown in FIG. 2, the transmission induction coil 210 may include an inductor L1 and a capacitor C1, and a circuit having desirable inductance and desirable capacitance can be constructed by the inductor L1 and the capacitor C1.

The transmission induction coil 210 may be constructed as an equivalent circuit in which both terminals of the inductor L1 are connected to both terminals of the capacitor C1. In other words, the transmission induction coil 210 may be constructed as an equivalent circuit in which the inductor L1 is connected to the capacitor C1 in parallel.

The capacitor C1 may include a variable capacitor, and impedance matching may be performed by adjusting the variable capacitor. The equivalent circuit of the transmission resonant coil 220, the reception resonant coil 310, and the reception induction coil 320 may be the same as that shown in FIG. 2.

FIG. 3 is a circuit diagram showing an equivalent circuit of the power supply apparatus 100 and the wireless power transmitter 200 according to one embodiment of the disclosure.

As shown in FIG. 3, the transmission induction coil 210 and the transmission resonant coil 220 may be constructed by using inductors L1 and L2 and capacitors C1 and C2 having predetermined inductances and capacitances, respectively.

FIG. 4 is a circuit diagram showing an equivalent circuit of the wireless power receiver 300 according to one embodiment of the disclosure.

As shown in FIG. 4, the reception resonant coil 310 and the reception induction coil 320 may be constructed by using inductors L3 and L4, and capacitors C3 and C4 having inductances and capacitances, respectively.

The rectifying part 330 may be constructed by using a diode D1 and a rectifying capacitor C5 and may output DC power by converting AC power into the DC power.

The rectifying part 330 may include a rectifier and a smoothing circuit. The rectifier may include a silicon rectifier as a rectifying element.

The smoothing circuit smoothes the output of the rectifier.

The load 400 may include a predetermined rechargeable battery or a device requiring the DC power. For example, the load 400 may refer to a battery.

The wireless power receiver 300 may be mounted on an electronic device, such as a cellular phone, a laptop computer, or a mouse, requiring the power.

FIG. 5 is a view showing a scenario of a wireless power repeater according to one embodiment of the disclosure.

Meanwhile, in the present embodiment, the scenario will be described on the assumption that at least one wireless power transmitter 20 and at least one wireless power repeater 60 are fixed in a house or an office and the wireless power receiver 30 is disposed between the wireless power transmitter 20 and the wireless power repeater 60. At this time, the location of the wireless power receiver 30 may be changed in the house or the office. In addition, according to the present embodiment, the wireless power repeater 60 includes four repeater resonators 64_1 to 64_4, but the embodiment is not limited thereto.

In general, wireless power generated from the wireless power transmitter 20 is transferred to the wireless power receiver 30 by using the resonance. However, if the coupling coefficient between the transmitter 20 and the receiver 30 is lower than the critical value, magnetic induction may prevail over magnetic resonance required for the wireless power transmission, so the power transmission efficiency may be lowered.

In order to solve the above problem, the wireless power repeater 60 is provided to control the wireless power receiver 30 such that the wireless power receiver 30 can be located in the straight line between the wireless power transmitter 20 and the repeater resonator 64.

The repeater resonators 64_1 to 64_4 of the wireless power repeater 60 are designed such that the coupling coefficient between the transmission resonant coil of the wireless power transmitter 20 and the repeater resonators 64_1 to 64_4 is equal to or higher than the critical value in order to receive energy from the wireless power transmitter 20 by using the resonance. At this time, the repeater resonators 64_1 to 64_4 of the wireless power repeater 60 may be designed to have the coupling co-efficient in the range of 0.05 to 1. Preferably, the repeater resonators 64_1 to 64_4 may be designed to have the coupling coefficient in the range of 0.1 to 1.

If the transmission resonant coil of the wireless power transmitter 20 makes the resonance with the repeater resonator 64 of the wireless power repeater 60, energy, that is, the wireless power is inter-exchanged between the wireless power transmitter 20 and the repeater resonator 64 through the resonance phenomenon. At this time, the intensity of energy is highest in the straight line between the wireless power transmitter 20 and the repeater resonator 64.

Thus, if the wireless power receiver 30 is located in the straight line between the wireless power transmitter 20 and the repeater resonator 64, the energy transmission can be concentrated onto the wireless power receiver 30.

That is, since the energy is inter-exchanged between the wireless power transmitter 20 and the repeater resonator 64 of the wireless power repeater 60, the wireless power receiver 30 located therebetween may receive the energy from both of the wireless power transmitter 20 and the repeater resonator 64, so that the wireless transmission efficiency can be improved.

For instance, as shown in FIG. 5, if a wireless power receiver 30_1 is located in the first position, the wireless power repeater 60 operates the first repeater resonator 64_1 and stops the operation of the remaining repeater resonators 64_2, 64_3 and 64_4.

In detail, the wireless power repeater 60 operates the first repeater resonator 64_1, which is located closest to the extension line of the wireless power transmitter 20 and the wireless power receiver 30_1, in such a manner that the wireless power receiver 30_1 can be located in the straight line between the wireless power transmitter 20 and the first repeater resonator 64_1. Thus, the wireless power receiver 30_1 may receive the greatest energy from the wireless power transmitter 20 and the first repeater resonator 64_1. Therefore, the energy can be concentrated in the direction where the wireless power receiver 30_1 is located.

In addition, if a wireless power receiver 30_2 is located in the second position, the wireless power repeater 60 operates the second repeater resonator 64_2 and stops the operation of the remaining repeater resonators 64_1, 64_3 and 64_4.

In detail, the wireless power repeater 60 operates the second repeater resonator 64_2, which is located closest to the extension line of the wireless power transmitter 20 and the wireless power receiver 30_2, in such a manner that the wireless power receiver 30_2 can be located in the straight line between the wireless power transmitter 20 and the second repeater resonator 64_2. Thus, the wireless power receiver 30_2 may receive the greatest energy from the wireless power transmitter 20 and the second repeater resonator 64_2. Therefore, the energy can be concentrated in the direction where the wireless power receiver 30_2 is located.

Further, if a wireless power receiver 30_3 is located in the third position, the wireless power repeater 60 operates the third repeater resonator 64_3 and stops the operation of the remaining repeater resonators 64_1, 64_2 and 64_4.

In detail, the wireless power repeater 60 operates the third repeater resonator 64_3, which is located closest to the extension line of the wireless power transmitter 20 and the wireless power receiver 30_3, in such a manner that the wireless power receiver 30_3 can be located in the straight line between the wireless power transmitter 20 and the third repeater resonator 64_3. Thus, the wireless power receiver 30_3 may receive the greatest energy from the wireless power transmitter 20 and the third repeater resonator 64_3. Therefore, the energy can be concentrated in the direction where the wireless power receiver 30_3 is located.

In addition, if a wireless power receiver 30_4 is located in the fourth position, the wireless power repeater 60 operates the fourth repeater resonator 64_4 and stops the operation of the remaining repeater resonators 64_1, 64_2 and 64_3.

In detail, the wireless power repeater 60 operates the fourth repeater resonator 64_4, which is located closest to the extension line of the wireless power transmitter 20 and the wireless power receiver 30_4, in such a manner that the wireless power receiver 30_4 can be located in the straight line between the wireless power transmitter 20 and the fourth repeater resonator 64_4. Thus, the wireless power receiver 30_4 may receive the greatest energy from the wireless power transmitter 20 and the third repeater resonator 64_4. Therefore, the energy can be concentrated in the direction where the wireless power receiver 30_4 is located.

In this manner, the specific repeater resonator of the wireless power repeater 60 is operated according to the position of the wireless power receiver 30, so that the wireless power transmission efficiency to the wireless power receiver 30 can be improved.

In addition, the repeater resonators 64_1 to 64_4 of the wireless power repeater 60 are designed such that the coupling coefficient between the reception resonant coil of the wireless power receiver 30 and the repeater resonators 64_1 to 64_4 is equal to or higher than the critical value in order to supply the wireless power to the reception resonant coil of the wireless power receiver 30 by using the resonance.

FIG. 6 is a view showing the wireless power repeater according to one embodiment of the disclosure.

Referring to FIG. 6, the wireless power repeater 60 includes a controller 62, a repeater resonator unit 64 and a position detector 66.

The repeater resonator unit 64 includes a plurality of repeater resonators spaced apart from each other by a predetermined distance. Each of the repeater resonators can be prepared as a circuit as shown in FIG. 2, that is, as a circuit having a predetermined inductance value and a predetermined variable capacitance value.

Under the control of the controller 62, a specific repeater resonator of the repeater resonators included in the repeater resonator unit 64 may be operated. That is, from among the repeater resonators of the repeater resonator unit 64, the repeater resonator located closest to the extension line of the wireless power transmitter and the wireless power receiver is operated. At this time, energy is inter-exchanged between the repeater resonator and the transmission resonant coil of the wireless power transmitter by using the resonance. In addition, the repeater resonator transfers the energy to the reception resonant coil of the wireless power receiver through the resonance or magnetic induction.

The position detector 66 detects the position of the wireless power receiver located in the vicinity of the position detector 66. The position detector 66 can detect the position of the wireless power receiver by using real time locating systems (hereinafter, referred to as RTLS).

The RTLS may adopt various types of position measuring schemes, such as a triangulation-AOA (Angle Of Arrival) scheme, a trilateration-RSS (Received Signal Strength) scheme, a TOA (Time Of Arrival) scheme, and a hyperbolic-TDOA (Time Difference Of Arrival) scheme.

The RTLS requires a tag for transmitting information of the RTLS in a predetermined period, and a device for receiving the information transmitted from the tag. At this time, at least three distance information with respect to the tag may be necessary to precisely detect the position of the tag.

According to the present embodiment, the wireless power receiver may include a tag having a unique ID. In addition, in order to precisely detect the position of the wireless power receiver including the tag, at least three wireless power repeaters 60 are necessary around the wireless power receiver. At this time, the wireless power repeaters 60 make wired and/or wireless communication with each other.

Under the above circumstance, the position detector 66 can receive the messages transmitted from the wireless power receiver in a predetermined period, so the position detector 66 can obtain the distance information with respect to the wireless power receiver. In addition, the position detector 66 can obtain the distance information with respect to the wireless power receiver from an adjacent wireless power repeater.

The position detector 66 can precisely detect the position of the wireless power receiver by using the position information thereof, the position information of the adjacent wireless power repeater and the distance information.

Meanwhile, although the position detector 66 uses the RTLS in the present embodiment, the embodiment is not limited thereto. For instance, the position of the wireless power receiver can be detected by using another position tracking scheme, such as the GPS (Global Positioning System) scheme.

The controller 62 obtains the position information of the wireless power receiver through the position detector 66. In addition, the controller 62 operates the specific repeater resonator of the repeater resonator unit 64.

The controller 62 previously stores fixed position information of the wireless power receiver. In addition, the controller 62 can acquire the position information of the wireless power receiver through the position detector 66.

Based on the position information, the controller can determine the repeater resonator located closest to the extension line connecting the transmitter and the receiver. Thus, the controller can control the repeater resonator unit such that only the specific repeater resonator located closest to the extension line can be operated.

For instance, as shown in FIG. 7, the controller 62 controls a plurality of switches 65_1 to 65_4 connected to the capacitors of the repeater resonators 64_1 to 64_4 included in the repeater resonator unit 64 in order to operate the specific repeater resonator only.

That is, when it is necessary to operate only the first repeater resonator 64_1, the controller 62 transmits an off signal to the first switch 65_1 of the first repeater resonator 64_1 and transmits off signals to the switches 65_2, 65_3 and 65_4 of the remaining repeater resonators 64_2, 64_3 and 64_4.

In this case, the first switch 65_1 is open so that the first repeater resonator 64_1 is operated. In addition, the remaining switches 65_2, 65_3 and 65_4 are shorted so that the operation of the remaining repeater resonators 64_2, 64_3 and 64_4 is stopped.

Accordingly, the controller 62 may operate only the specific repeater resonator by using the switches. Meanwhile, although the present embodiment has been described in that the controller operates a plurality of repeater resonators by using a plurality of switches, the embodiment is not limited thereto.

As described above, according to the disclosure, the specific repeater resonator of the wireless power repeater can be operated based on the position of the wireless power transmitter and the wireless power receiver, so that the wireless power transmitted from the wireless power transmitter can be concentrated in the specific direction.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A wireless power repeater for relaying power transmission in which a wireless power receiver is disposed between a wireless power transmitter and the wireless power repeater, the wireless power repeater comprising:
a position detector for detecting a position of the wireless power receiver;
a repeater resonator unit including a plurality of repeater resonators; and
a controller for operating one repeater resonator of the plurality of repeater resonators, which is located close to an extension line of the wireless power transmitter and the wireless power receiver, based on position information detected by the position detector;
wherein the controller controls switches provided in the repeater resonators, respectively, to operate the one repeater resonator of the plurality of repeater resonators, and
wherein a coupling coefficient between the one repeater resonator of the plurality of repeater resonators and a transmission resonant coil of the wireless power transmitter is equal to or higher than a critical value.

2. The wireless power repeater of claim 1, wherein the position detector detects the position of the wireless power receiver by using real time locating systems.

3. The wireless power repeater of claim 2, wherein the position detector detects the position of the wireless power receiver based on distance information received from an adjacent wireless power repeater and distance information acquired by the position detector.

4. The wireless power repeater of claim 1, wherein the position detector detects the position of the wireless power receiver by using a GPS (global positioning system) scheme.

5. The wireless power repeater of claim 1, wherein the respective repeater resonators further include a inductor and a capacitor,
wherein the respective switches of the repeater resonators are connected in parallel to at least one of the inductor and the capacitor.

6. The wireless power repeater of claim 1, wherein each of the repeater resonators has a predetermined inductance value and a predetermined variable capacitance value.

7. The wireless power repeater of claim 1, wherein the controller operates the repeater resonator based on the position information detected by the position detector and position information of the wireless power transmitter which is previously stored.

8. The wireless power repeater of claim 1, wherein the wireless power transmitter and the wireless power repeater are resonance-coupled with each other and the wireless power repeater and the wireless power receiver are resonance-coupled with each other to inter-exchange power.

9. A wireless power repeater for relaying power transmission in which a wireless power receiver is disposed between a wireless power transmitter and the wireless power repeater, the wireless power repeater comprising:
a position detector for detecting a position of the wireless power receiver;
a controller for operating one repeater resonator from among a plurality of repeater resonators based on position information detected by the position detector; and
a repeater resonator unit for supplying wireless power to the wireless power receiver located between the wireless power transmitter and the repeater resonator under a control of the controller;
wherein the controller controls switches provided in the repeater resonators, respectively, to operate the one repeater resonator of the plurality of repeater resonators, and
wherein a coupling coefficient between the one repeater resonator of the plurality of repeater resonators and a transmission resonant coil of the wireless power transmitter is equal to or higher than a critical value.

10. The wireless power repeater of claim 9, wherein the position detector detects the position of the wireless power receiver by using real time locating systems.

11. The wireless power repeater of claim 9, wherein the position detector detects the position of the wireless power receiver by using a GPS (global positioning system) scheme.

12. The wireless power repeater of claim 9, wherein the respective repeater resonators further include an inductor and a capacitor,
wherein the respective switches of the repeater resonators are connected in parallel to at least one of the inductor and the capacitor.

13. The wireless power repeater of claim 9, wherein each of the repeater resonators has a predetermined inductance value and a predetermined variable capacitance value.

14. A wireless power repeater for relaying power transmission in which a wireless power receiver is disposed between a wireless power transmitter and the wireless power repeater, the wireless power repeater comprising:
a position detector located near the wireless power receiver for obtaining a position information of the wireless power receiver;
a plurality of repeater resonators operable to the position information; and
a controller for controlling the plurality of repeater resonators based on the position information such that one repeater resonator of the plurality of repeater resonators is operable, the one repeater resonator is the closest to a virtual line between the wireless power transmitter and the wireless power receiver;

wherein the controller controls switches provided in the repeater resonators, respectively, to operate the one repeater resonator of the plurality of repeater resonators, and wherein the wireless power receiver makes resonance with both the wireless power transmitter and the wireless power repeater.

15. The wireless power repeater of claim 14,
wherein a coupling coefficient between the one repeater resonator of the plurality of repeater resonators and a transmission resonant coil of the wireless power transmitter is equal to or higher than a critical value.

16. The wireless power repeater of claim 14, wherein the respective repeater resonators further include an inductor and a capacitor,
wherein the respective switches of the repeater resonators are connected in parallel to at least one of the inductor and the capacitor.

17. The wireless power repeater of claim 14, wherein the position detector detects the position of the wireless power receiver by using real time locating systems or by using a GPS (global positioning system) scheme.

\* \* \* \* \*